No. 893,000. PATENTED JULY 14, 1908.
G. W. LOGGIE.
VACUUM CLAMPING DEVICE FOR STAVE COLUMNS.
APPLICATION FILED NOV. 4, 1907.
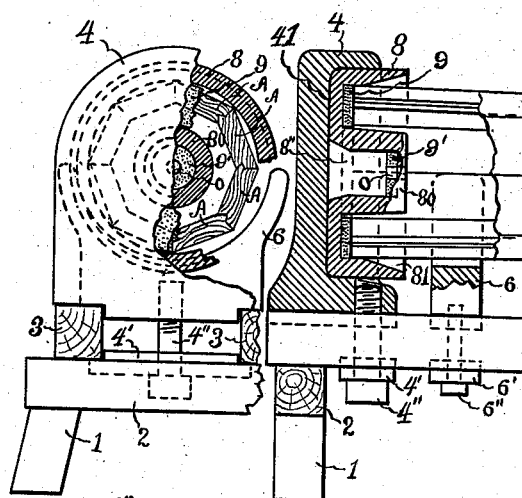
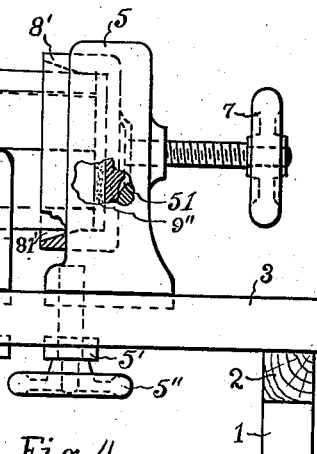
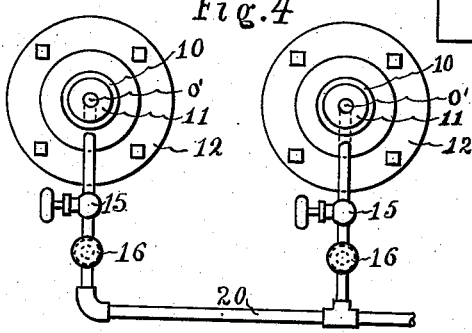
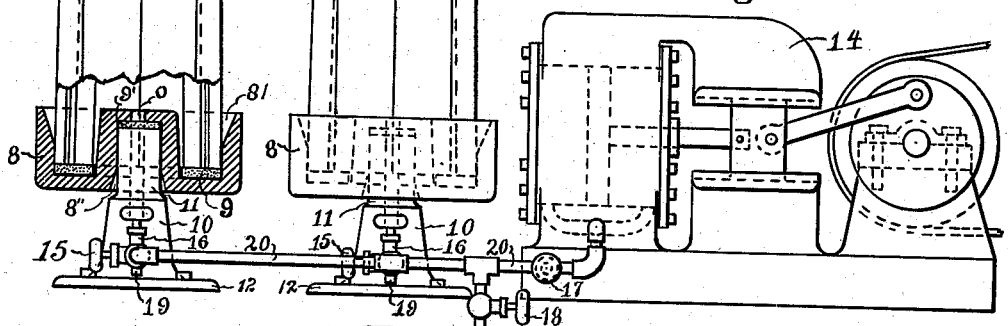
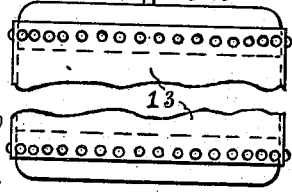
WITNESSES
INVENTOR
George W. Loggie
BY David E. Lain
ATTORNEY

UNITED STATES PATENT OFFICE.

GEORGE W. LOGGIE, OF BELLINGHAM, WASHINGTON.

VACUUM CLAMPING DEVICE FOR STAVE COLUMNS.

No. 893,000.      Specification of Letters Patent.      Patented July 14, 1908.

Application filed November 4, 1907. Serial No. 400,696.

*To all whom it may concern:*

Be it known that I, GEORGE W. LOGGIE, a citizen of the United States, and a resident of Bellingham, in the county of Whatcom and State of Washington, have invented certain new and useful Improvements in Vacuum Clamping Devices for Stave Columns, of which the following is a specification.

My invention relates to an improvement in devices for clamping stave, porch columns in which the clamps must retain the staves in proper place in the column while the glue with which their matched surfaces have been smeared in setting. The present practice is to confine the assembled staves in metallic band or chain clamps and tighten the same with either screws or a cam lever. A number of these clamps are required to properly draw the staves together, necessitating considerable time in their adjustment, tightening and removal. Also these chains or bands sink into the wood causing more or less disfigurement to the surface. In my device I close the ends of the hollow column with air tight caps, then exhaust the air from the interior of the column and maintain this vacuum until the glue has hardened sufficiently to retain the staves together. Thus I entirely dispense with the clamps ordinarily used. The device with which I accomplish this object is illustrated in the accompanying sheet of drawings in which similar characters refer to similar parts throughout.

Figure 1 is an end elevation of a device in which the columns are assembled and receive the air tight caps. Fig. 2 is a front elevation of Fig. 1. Fig. 3 is a front elevation of an air pump with connecting pipes and certain fixtures for holding the columns while they are under air pressure. And Fig. 4 is a plan view of said fixtures. A portion of Fig. 1 is removed for lack of space; certain other parts are also removed in order to better show the parts lying beneath. For the same purpose certain parts are also removed in Figs. 2 and 3.

In Figs. 1 and 2, 1, 2 and 1, 2 are supports for the shears 3, 3. 4 is a head-stock with a deep recess 41 for receiving the cap 8. Head-stock 4 is secured to the shears 3, 3 by clamp 4' and clamp screw 4''. Tail-stock 5 has a deep recess 51 for receiving the cap 8' and is retained on the shears by the clamp 5' and clamping, hand-wheel screw 5''. There is also a tail-screw 7 suited to work in tail-stock 5. Forms 6, 6 are clamped to the shears by clamps 6', 6' and clamp screws 6'', 6''. The stave column illustrated is composed of eight, similar, tapering staves of equal length. These staves are matched with V form tongues and grooves and are slightly crowned in the center. No attempt has been made to show said enlargement in the center because it is ordinarily too small to be illustrated in the scale used. These staves A, A, A, A, and four others not designated by characters, are first smeared with glue on their matched edges and properly assembled in forms 6, 6. Cap 8 is placed in the deep recess 41 in head-stock 4 and the larger end of the loosely assembled column is shoved into its flaring recess 81 in the bottom of which is the rubber gasket 9. Cap 8', which has a flaring recess 81' similar to 81 in cap 8, and in the bottom of which is also a rubber gasket 9'', is placed in the deep recess 51 in tail-stock 5. Tail-stock 5 is advanced toward the column until the smaller end of said column has entered the recess 81' in cap 8' and then said tail-stock is clamped to the shears by turning hand-wheel 5''. Tail-screw 7 is then turned until the ends of the column A, A, A, A are rammed home in caps 8 and 8', with the ends of said column closely seated on rubber gaskets 9 and 9''. The recesses 81 and 81' are of such diameter that when the ends of the column are forced therein the staves composing said column are brought snugly together, yet the fit of said caps is not so tight but that they may afterwards be easily removed with a few blows of a hammer. In the center of recess 81 in cap 8 stands the boss 80. In this boss, opening outward, is the cylindrical recess 8'' with a conical entrance. Through the walls of this boss is the central hole O. Also lying on the bottom of the recess 8'' is the rubber gasket 9'.

Figs. 3 and 4 show two standards 10, 10. These consist of the foot part 12, the body 10 and the cylindrical top 11. This cylindrical top is suited to make an easy fit in the recess 8'' in cap 8 and fit snugly against the gasket 9'. In these standards are the holes O', O' which are so placed as to register with hole O in cap 8 when said cap is placed on one of said standards. Hole O' passes downward into the standard, turns at right angles and makes an outlet through the body 10 of the same. The system of pipes 20 is connected with the said outlets of holes O', O' in standards 10, 10, also with vacuum tank 13 and air pump 14 in Fig. 3. The interior valves necessary for the proper working of air pump 14 are not shown in this illustration.

In the branches of the system of pipes 20 leading from the main line to the standards 10, 10 are the two-way cocks 15, 15. These are provided with inlet tubes 19, 19 Fig. 3 and are located nearest said standards. They are so constructed that when opened to the passage of air through the pipes 20 they are closed to the passage of air through tubes 19 and vice versa. Also in said branch pipes are the valves 16, 16. On another branch pipe from main line pipe 20 is a branch leading into the vacuum tank 13, Fig. 3. Valve 18 is placed in this branch. In main-line pipe 20 near air pump 14 is a valve 17. In practice I use a number of standards 10, 10 connected with main line pipe 20, but for the purpose of this description only two are shown.

After the caps 8, 8' have been placed on a stave column as shown in Figs. 1 and 2, the column with said caps in place is put, cap 8 downward, on a standard 10 with top 11 of said standard in the cylindrical recess 8'' in said cap. Thus placed the capped column is retained in a vertical position on said standard. Also the top 11 of said standard fits snugly against the gasket 9', thus making an air lock at this point. Then since the ends of the staves are pressed snugly against gaskets 9 and 9'', the hollow columns placed on the standards, as shown in Fig. 3, are properly prepared to have the air exhausted from their interior. This is accomplished by running the air pump 14 with valves 16, 16 and 17 open and cocks 15, 15 closing inlet pipes 19, 19. Vacuum tank 13 is included in the pipe system in order to have a reserve vacuum in addition to the pumping capacity of the air pump. The stave columns thus placed under atmospheric pressure are powerfully and evenly compressed over their entire surface, thus bringing all matched surfaces snugly together, and in this position they are retained until the glue has set sufficiently to hold them. Then each column is removed by first closing valve 16 then opening cock 15 when air will enter the column and it may be easily removed from the standard. Caps 8 and 8' are then removed and the column is ready for turning down to finished form.

My method of clamping stave columnss a herein described does not mar the surface of said columns as is the case with the clamps ordinarily used, is more rapid in operation, and because of the vacuum maintained within the column, the glue sets more quickly than it does under ordinary atmospheric pressure.

I may vary the herein described method and machinery in details as circumstances require without passing beyond the limits of my invention which consists in,—

1. A vacuum clamping device used in manufacturing stave columns in which is combined means for holding a number of staves assembled in columnar form; means for hermetically sealing the ends of said stave columns; and means for exhausting the air from within said stave columns.

2. In a vacuum device for clamping stave columns, the combination of leg frames; parallel guides or shears resting on and securely attached to said leg frames; a headstock and a tail-stock suited to stand upon and slide upon and between said shears; a cylindrical recess with wide flaring entrance in each of said stocks, said recesses being centrally located and when said stocks are facing each other said recesses being opposite each other and concentric; clamps and screws for fastening said stocks to any desired location on said shears; a tail screw centrally located in said tail-stock; two or more forms to stand upon and slide upon and between said shears, said forms being provided with screw clamps for making fast to said shears and having a concave, semi-circular, upper surface concentric with the recesses in said stocks, said forms holding a number of staves, of equal length and properly matched to form a column, assembled in columnar form; a cap, with a cylindrical or slightly conical recess with wide flaring entrance, of such size that it may nest in the recess in said head-stock, said cap having a central boss in said recess, and said boss having a central, cylindrical recess entering from the outside of said cap and a central hole piercing the top wall of said boss; a resilient gasket in the bottom of the recess in said cap and around said boss; a resilient gasket in the bottom of said recess in said boss, said gasket having a central hole concentric with the hole piercing the top of said boss; a cap, with a cylindrical or slightly conical recess with wide flaring entrance, of such size that it may nest in the recess of said tail-stock; a gasket of resilient material in the bottom of said recess in said cap; a standard consisting of a foot, body and top parts, said foot being suited to be fastened to the floor, said top part being suited to loosely fit into the cylindrical recess in said boss in said cap, a hole passing from the center of the upper surface of said top through said standard to a place where it ends in a tapped part to receive a pipe; an air pump with suitable power connections, said pump being connected by a line of pipes to said standard, there being a two-way cock in said line of pipes next to said standard, a valve next to said two-way cock, and a valve next to said air pump; and a vacuum tank connected through a pipe with said line of pipes, said connecting pipe is provided with a valve.

Signed at Bellingham in the county of Whatcom and State of Washington this 26th day of October A. D. 1907.

GEORGE W. LOGGIE.

Witnesses:
 R. S. SIMPSON,
 DAVID E. LAIN.